United States Patent
Page

[11] 3,981,650
[45] Sept. 21, 1976

[54] MELT BLOWING INTERMIXED FILAMENTS OF TWO DIFFERENT POLYMERS

[75] Inventor: Robert E. Page, Davis, Ill.

[73] Assignee: Beloit Corporation, Beloit, Wis.

[22] Filed: Jan. 16, 1975

[21] Appl. No.: 541,504

[52] U.S. Cl. ............................. 425/72 S; 264/176 F; 425/131.5; 425/377; 425/382.2; 425/463
[51] Int. Cl.$^2$ .......................................... B29F 3/04
[58] Field of Search ............. 425/72 R, 72 S, 131.1, 425/376, 131.5, 377, 378 R, 378 S, 379 R, 379 S, 382.2, 382, 382 N, 462, 463; 264/176 F, 177 F

[56] References Cited
UNITED STATES PATENTS

| | | | |
|---|---|---|---|
| 3,181,201 | 5/1965 | Seiz | 425/463 |
| 3,403,422 | 10/1968 | Nakagawa et al. | 425/131.5 |
| 3,659,988 | 5/1972 | Walczak | 425/382.2 X |
| 3,797,987 | 3/1974 | Marion | 425/463 |
| 3,806,289 | 4/1974 | Schwarz | 425/72 S |
| 3,825,379 | 7/1974 | Lohkamp et al. | 425/72 S |
| 3,825,380 | 7/1974 | Harding et al. | 425/72 S X |

*Primary Examiner*—Francis S. Husar
*Assistant Examiner*—Mark Rosenbaum
*Attorney, Agent, or Firm*—Hill, Gross, Simpson, Van Santen, Steadman, Chiara & Simpson

[57] ABSTRACT

A plastic extrusion mechanism having a die head primarily for use in a melt-blown process with the head formed in two mating parts respectively having first and second chambers therein with separate plastic heaters and pressure delivery extruder screws connected thereto and an insulated wall between the chambers with the lower end of the wall having slots leading to passages and alternate passages communicating with the first or second chambers and the passages leading to small extrusion openings for extruding microfibers of plastic and high velocity air directed against the microfibers for attenuation, and a traveling porous surface beneath the die head for receiving the fibers which are formed of plastic from the first chamber having a first physical characteristic and the second chamber having a different physical characteristic.

12 Claims, 5 Drawing Figures

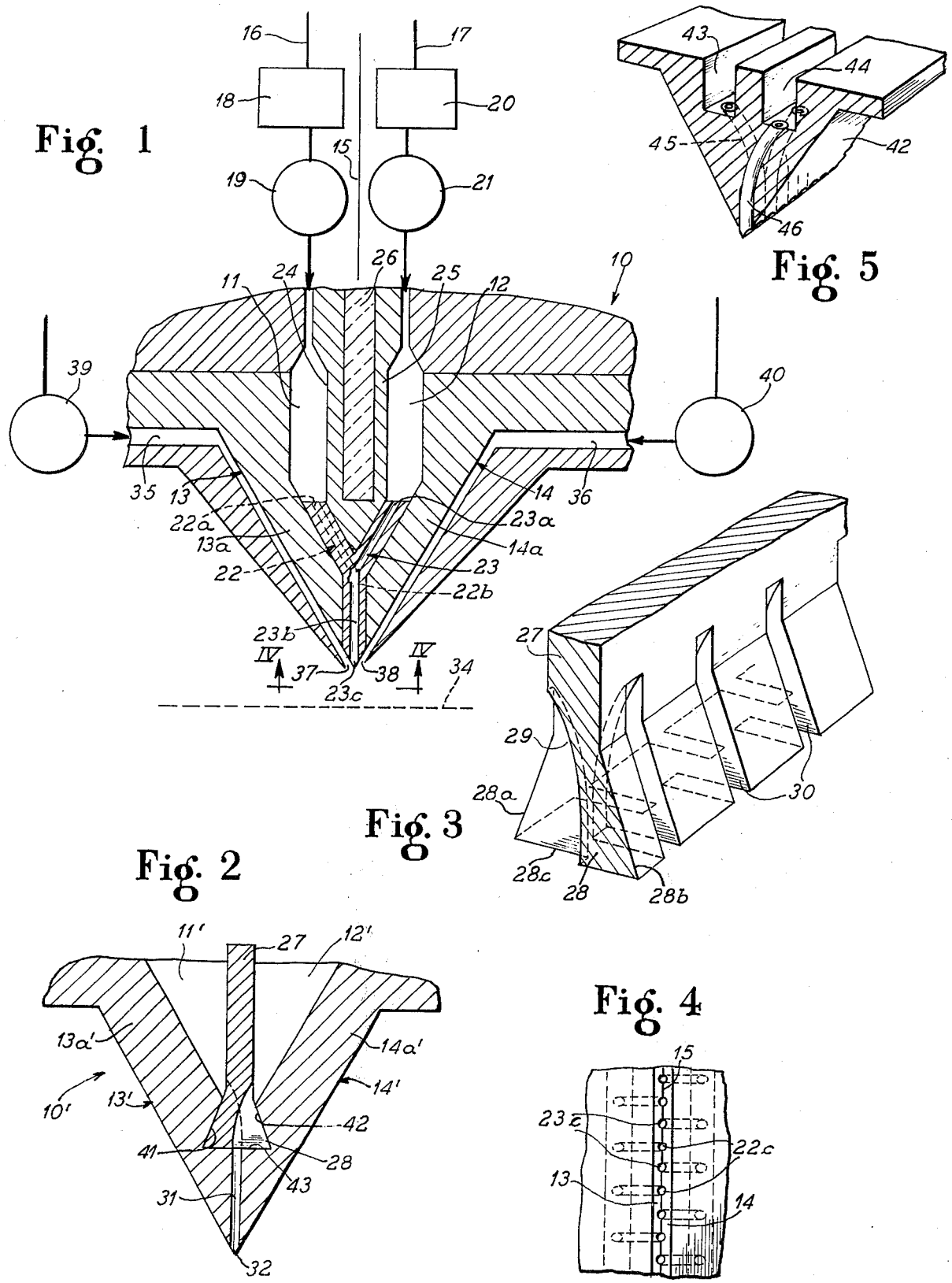

3,981,650

MELT BLOWING INTERMIXED FILAMENTS OF TWO DIFFERENT POLYMERS

BACKGROUND OF THE INVENTION

The present invention relates to improvements in die heads for forming different fibers from a common die, and more particularly to a die head assembly structure which forms two different fibers preferably in a melt-blown process.

In the melt-blown process microfibers of plastic are emitted from small die openings arranged in a row with the fibers attenuated by high velocity streams of air. Examples of this type of structure are shown in the copending applications of Langdon and Gerschon, Ser. No. 366,557, filed June 4, 1973 and Langdon, Ser. No. 463,460, filed Apr. 24, 1974, the disclosures of which are incorporated herein by reference in their entirety.

In the forming of a mat having fibers made by the melt-blown process, it is sometimes desirable to mix different polymers which have different physical characteristics. These different polymers may, in addition to having different physical characteristics in the filaments or threads that are finely formed, have different requirements for extrusion. That is, for optimum extrusion and attenuation, each may require delivery at a different pressure and may require that the plastic be at a different temperature. Each will have an optimum pressure and temperature, and possibly an optimum size extrusion opening to provide a filament which takes advantage of all the potential properties of the particular polymer. For providing a web which includes filaments of two different polymers, they should be formed simultaneously to obtain a mechanical entanglement and be formed so that the fibers are intermixed and positioned adjacent each other. Structures which heretofore operated under the melt-blowing process have been capable of providing at one time only a single polymer, and it has been necessary to provide a separate die head or to operate in a separate run to produce filaments from a second polymer having different characteristics.

It is accordingly an object of the present invention to provide a head construction for extrusion of filaments, preferably well adapted for use in the melt-blown process, which is capable of simultaneously forming plastic filaments from two different polymers.

A further object of the invention is to provide a head for use in a melt-blown process which has improved design features capable of producing two different polymers at their optimum temperature and wherein the production of each polymer does not interfere with or adversely effect the production of the other polymer.

A still further object of the invention is to provide a die head having improved construction characteristics which enables it to be relatively easily constructed and maintained and which is capable of producing simultaneously two different polymers in a melt-blown process and does not require excessive physical space so that it can operate efficiently and produce filaments in such a manner that they can readily be attenuated by high velocity air in accordance with the principles of the melt-blowing process.

Other objects, advantages and features, as well as equivalent structures which are intended to be covered herein, will become more apparent with the teaching of the principles of the invention in connection with the disclosure of the preferred embodiments in the specification, claims, and drawings, in which:

DESCRIPTION OF THE DRAWINGS

FIG. 1 is a somewhat schematic side elevational view of a plastic flow diagram, showing an extrusion head in some detail, having a structure, and operation in accordance with the principles of the present invention;

FIG. 2 is a side elevational view, partially in section, of an alternative embodiment of the invention;

FIG. 3 is a detailed perspective view showing a part of the head of FIG. 2;

FIG. 4 is a bottom fragmentary plan view taken substantially along line IV—IV of FIG. 1; and FIG. 5 is a fragmentary somewhat schematic view of another form of the invention.

DESCRIPTION

As illustrated in FIG. 1, a plastic extrusion head 10 is provided with a first plastic chamber 11 for a first plastic, and a second plastic chamber 12 for a second plastic. The head is preferably formed in two generally symmetrical parts 13 and 14 with portions 13a and 14a forming outer walls for the chambers 11 and 12. The head parts meet in a seam 15, and the parts are suitably clamped together such as by bolts through a flange at the ends or by being welded to each other. A central wall extends between the chambers having a wall portion 24 facing the first chamber 11, and a wall portion 25 facing the second chamber 12, with insulation 26 between the walls.

In another form of construction, the plastic extrusion head 10 may be formed such as by being cast in one piece. The passages 11 and 12 will be cored openings in the casting, and the passages 22 and 23 will be drilled. The upper portions 22a and 23a may be drilled from the passages 11 and 12, and the lower portions 22b and 23b may be drilled from the bottom end.

A first plastic is delivered to the first chamber at a first temperature $T_1$ and at a first pressure $P_1$, the plastic being delivered through a line 16 to a supply hopper 18 which delivers to an extruder screw 19 having a plastic heater.

Plastic is delivered to the second chamber 12 at a second pressure $P_2$ and a second temperature $T_2$ from a line 17 with the plastic passing to a supply hopper 20 to an extruder screw 21 and having a heater.

The heaters are constructed so as to control the different plastics at their optimum temperatures $T_1$ and $T_2$. Similarly, the extruders 19 and 21 will deliver plastic to the chambers at the optimum pressures $P_1$ and $P_2$ respectively for the plastics involved. The plastics are separate polymers, each having a different physical characteristic to provide separate filaments and threads which will mechanically intertwine to provide the desired mat beneath the head. For receiving the filaments that are extruded, a traveling porous surface such as a screen 34 travels some distance beneath the head receiving the filaments therefrom. As the different plastics descend through the chambers 11 and 12 in the head, they flow down through individual plastic flow passages 22 and 23.

Another form of nose-piece construction for the plastic extruder is shown in FIG. 5 and will be described in greater detail later herein.

These passages have an upper portion 22a and 23a respectively, and a lower portion 22b and 23b respectively. The passages terminate in openings 22c and 23c at the lower tip of the head and are interspersed, as shown in FIG. 4 so that each two openings 22c for the plastic have an opening 23c for the second plastic between them. While alternating arrangements are preferred, other arrangements may be used such as two openings for one plastic to each opening of the other plastic where twice as many filaments of the first plastic are to be provided.

The passages 22 and 23 are preferably of the same size to provide openings 22c and 23c of the same size although slightly different sizes may be employed wherein different size filaments for the different plastics are required.

As the plastic filaments emerge from the openings 22c and 23c, they are immediately engaged with a high velocity flow of air from lateral air chambers 35 and 36. These chambers are placed close to the outer surfaces of the head or as a part of the outer surfaces and terminate in air jet openings 37 and 38 which direct flows of air along the plastic filaments from an angle between 0° to 90° of the axes of the filaments. Air supply structures 39 and 40 are provided to deliver streams of heated high velocity air which attains a velocity approaching supersonic speeds as referred to in the abovementioned copending applications.

FIGS. 2 and 3 show an alternate die nose construction wherein a die 10' is formed in two opposing sections 13' and 14' having first and second plastic chambers 11' and 12'. In another form of construction, the die 10' could be formed of one piece machined to receive a wall insert 27. The outer walls of the chambers are provided at 13a' and 14a', and a central dividing wall 27 separates the chamber. Where plastics are to be employed having a substantially different plastic temperature, the dividing wall 27 will be provided with a layer of insulation similar to that illustrated in FIG. 1.

The chambers 11' and 12' lead downwardly to plastic flow passages 31 on the lower end of the nose-piece, and open in filament extrusion openings 32 which alternate in position for the chambers 11' and 12' in the manner described in connection with the structure of FIG. 1.

The lower passages 31 may be formed of one piece in which strait holes are drilled upwardly or by the two half sections of the head being placed together and then the passages formed by drilling holes extending upwardly. Another form of construction will be to mill slots in the opposing halves of the head with the slots conforming in position to form the passages 31 when the halves are assembled.

The upper portions of the passages 31 are provided by a unique dovetail centerpiece 28. This centerpiece, shown in greater detail in FIG. 3, has diverging upper surfaces 28a and 28b and a relatively flat lower surface 28c. The diverging upper surfaces 28a and 28b are wedged downwardly by downwardly facing surfaces 41 and 42 of the head or halves of the head. It is to be noted that the pressure of the descending polymer mix in each of the chambers 11' and 12' acts on the upwardly facing surfaces 28a and 28b of the centerpiece 28 so as to force it downwardly to cause the lower surface 28c to seat against a flat surface 43 formed in the head section. This prevents any leakage or intermingling of plastic flowing downwardly to the passages 31. The upper portion of the passages 31 are formed by milled slots 29 and 30 extending part-way into the faces of the two sides of the dovetailed piece 28. This provides an accurate economical way of forming the upper portion of the passages 31. The slots 29 and 30 are formed in alternate positions from opposite sides of the dovetail piece 27 with the slots 29 communicating with the first chamber 11' and the slots 30 communicating with the second chamber 12'. The slots 29 communicate with alternate lower portions of the passages 31 and the slots 30 communicate with other alternate lower portions of the slots 31 so that as filaments emerge from the openings at the bottom of the die head, the filaments will alternately be of a different polymer. The machine slots 29 and 30 are accurately aligned with the lower portions of the passages 31, but preferably are machined approximately 1½ times wider than the diameter of the holes 31 so as to assure alignment therewith. The excess width of the slots is blocked off by the flat surface 43 against which the dovetail piece seats.

Thus, in operation, different polymers of different physical characteristics are delivered through the two lines 16 and 17 to enter the chambers 11 and 12 in the arrangement of FIG. 1, and the chambers 11' and 12' of FIG. 2. The different polymers flow downwardly to be directed into the extrusion orifices arranged in a row so that a predetermined pattern of filaments of alternating plastic material emerges to be attenuated by the high velocity air. The construction is such that it can be manufactured to provide the very small openings necessary, and the parts can be readily separated for cleaning or replacement.

FIG. 5 shows another form of die nose construction. A die nose 42 is cast in a single piece and has a pair of elongate channels 43 and 44 for receiving the two flows of plastic passing downwardly through the die head. The channels 43 and 44 each lead to a series of capillary tubes 45 and 46 respectively. These can be cast into the head or drilled or can be tubes which are initially cast into the nose-piece. In one form of construction the capillary tubes are preformed and bent and cast into place as illustrated in FIG. 5. The tubes are bent so that each of the rows 45 and 46 respectively receives a separate flow of plastic at the lower ends of the tubes, which are positioned in an aligned row.

I claim as my invention:

1. A plastic extrusion mechanism comprising in combination:
   a die head having a first chamber for a first plastic and a second chamber for a second plastic;
   a plurality of first small extrusion passages leading from the first chamber to first openings arranged in a row;
   a plurality of second small extrusion passages leading from the second chamber to second openings in said row interspersed between said first openings;
   first plastic delivery means connected to said first chamber for delivery of a first plastic thereto;
   second plastic delivery means connected to said second chamber for delivery of a second plastic thereto said second plastic having different physical characteristics than said first plastic, and
   first and second high velocity gas delivery means each one being on a different side of said row for directing a flow of air towards filaments emitted from respective ones of said first and said second openings at an angle between 0° and 90° relative to the axes of said filaments.

2. A plastic extrusion mechanism constructed in accordance with claim 1:

wherein said first and second openings are arranged to be in respectively alternating positions in said row;

and including a porous member positioned opposite said openings and spaced therefrom to receive filaments of plastic.

3. A plastic extrusion mechanism constructed in accordance with claim 1:

wherein said first plastic delivery means includes a pressure mechanism for delivering the plastic under a first pressure and a heater for raising the temperature of the plastic to a first temperature;

and said second plastic delivery means includes a second pressure delivery means for delivering plastic at a second pressure different than said first pressure and a second heater for heating the plastic to a second temperature different than said first temperature.

4. A plastic extrusion mechanism constructed in accordance with claim 3:

and including an insulating wall between said first and said second chambers.

5. A plastic extrusion mechanism constructed in accordance with claim 1:

wherein said die head is formed of two mating parts with the first part containing said first chamber and the second part containing said second chamber and said parts jointly providing walls for said first and second extrusion passages.

6. A plastic extrusion mechanism constructed in accordance with claim 1:

wherein said first and said second passages each are formed with first and second portions with each portion being a straight passage and the first portion joining the second portion at an angle.

7. A plastic extrusion mechanism constructed in accordance with claim 1:

wherein said first and said second passages have first and second portions with the first portions formed by machine milled slots in a wall between said chambers and said second portion is a continuation of said first portion.

8. A plastic extrusion mechanism constructed in accordance with claim 1:

wherein said die head is formed of mating first and second parts respectively containing said first and second chambers with a wall therebetween and the lower edge of said wall flaring outwardly in the direction of plastic flow and interengaging recesses in the first and second head parts to be held therein with machined slots formed on opposite sides of said wall forming respectively first portions of said first and second passages and said wall being urged in the direction of plastic flow by pressures in said first and second chambers.

9. A plastic extrusion mechanism constructed in accordance with claim 1:

wherein said first and said second passages have a first portion formed by milled slots in a wall between said chambers and second portions formed by continuing openings where the milled slots are wider than said second portions of the passages.

10. A plastic extrusion mechanism constructed in accordance with claim 1:

wherein said first and second extrusion passages are formed in preformed tubes embedded in a one-piece die head nose-piece.

11. A plastic extrusion mechanism constructed in accordance with claim 1:

wherein said die head is formed of one piece and said extrusion passages are formed by drilled openings extending through the head.

12. The plastic extrusion mechanism of claim 1 including a traveling porous surface located in spaced relationship beneath said head for receiving therefrom melt blown filaments thereon.

* * * * *